United States Patent
Ferreol et al.

(10) Patent No.: US 6,693,591 B2
(45) Date of Patent: Feb. 17, 2004

(54) METHOD AND DEVICE FOR CO-OPERATIVE RADIO DIRECTION-FINDING IN TRANSMISSION

(75) Inventors: Anne Ferreol, Colombes (FR); François Delaveau, Le Plessis S/Marne (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/234,161

(22) Filed: Sep. 5, 2002

(65) Prior Publication Data

US 2003/0103003 A1 Jun. 5, 2003

(30) Foreign Application Priority Data

Sep. 5, 2001 (FR) .............................. 01 11488

(51) Int. Cl.⁷ ................................ G01S 5/02
(52) U.S. Cl. .................. 342/417; 342/457; 342/453
(58) Field of Search ............... 342/417, 457, 342/387, 453

(56) References Cited

U.S. PATENT DOCUMENTS

| 5,752,168 | A | 5/1998 | Monot et al. |
|---|---|---|---|
| 6,205,341 | B1 | 3/2001 | Monot et al. |
| 6,239,746 | B1 | 5/2001 | Pipon et al. |
| 6,240,098 | B1 | 5/2001 | Thibault et al. |
| 6,253,084 | B1 | 6/2001 | Monot |
| 6,349,207 | B1 | 2/2002 | Monot et al. |
| 6,430,239 | B1 | 8/2002 | Ferreol |
| 6,546,256 | B1 * | 4/2003 | Maloney et al. ............ 455/456 |

FOREIGN PATENT DOCUMENTS

| EP | 0 866 568 A1 | 3/1997 |
|---|---|---|
| EP | 1 031 847 A1 | 2/2000 |
| FR | 2 764 074 | 12/1998 |

* cited by examiner

*Primary Examiner*—Theodore M. Blum
(74) *Attorney, Agent, or Firm*—Oblon, Spivak, McClelland, Maier & Neustadt, P.C.

(57) ABSTRACT

In a method of co-operative radio direction-finding in transmission in a system of radio direction-finding for a radio-communications system comprising one or more transmission sources or transmitters, the transmitted signal comprises a reference sequence formed by a sequence of symbols $\{S_k\}$, the receiver comprising at least one array of several sensors coupled to a radio direction-finder. The method comprises the following steps:

a) determining the reference signal or signals $d_r(t)$ associated with a transmitter m from the reference symbols $\{S_k\}$ and from the modulation defined by the format of the signals; b) defining the instant of arrival $t_k$ of one or more reference signals; c) from the signal $\underline{x}(t)$ received at the sensors, the instants of arrival $t_k$ and the reference signal or signals $d_r(t)$ derived from the step a), determining the value or values of incidence of the signals for a given transmitter. The method can be applied to GSM or UMTS signals.

19 Claims, 5 Drawing Sheets

RECEPTION SYSTEM

METHOD AND DEVICE FOR CO-OPERATIVE RADIO DIRECTION-FINDING IN TRANSMISSION

BACKGROUND OF THE INVENTION

1. Field of the Invention

The present invention relates to a method and a device for co-operative radio direction-finding in transmission for signals comprising a reference signal.

The invention can be applied especially to the case of signals comprising a synchronization signal or reference signal, consisting of a sequence of known symbols defined by the transmission standard used within the transmission system.

For example, the GSM (Global System for Mobile communications), consisting of several reference signals, has this characteristic. In such a context, a reception system such as a base station may perform a selective direction-finding operation and associate a direction of arrival with a synchronization sequence. The techniques of selective direction-finding can be used to isolate one transmitter from the others on the basis of knowledge of its reference signal. It is thus possible to carry out a selective direction-finding operation for the transmitter, thus reducing the risk of ambiguity.

2. Description of the Prior Art

The patent FR 2 764 074 describes a method for carrying out a direction-finding operation in the case of single-user operation and for linear modulations or waveforms that may be approximated in terms of linear modulations. In this patent, linearly modulated digital signals $s_e(t)$ are sent. The symbols $a_1$, $a_2$, $a_3$, etc., associated with the signal, are transmitted at the period $T_s$ and then filtered by a FIR (Finite Impulse Response) filter with a response $h(t)$.

Thus, the following is the relationship between the transmitted signal $s_e(t)$ and the symbols $a_n$:

$$s_e(t) = \sum_n h(t - nT_s) a_n \quad (1)$$

where $h(t)$ corresponds to the shaping filter.

Figure 1:
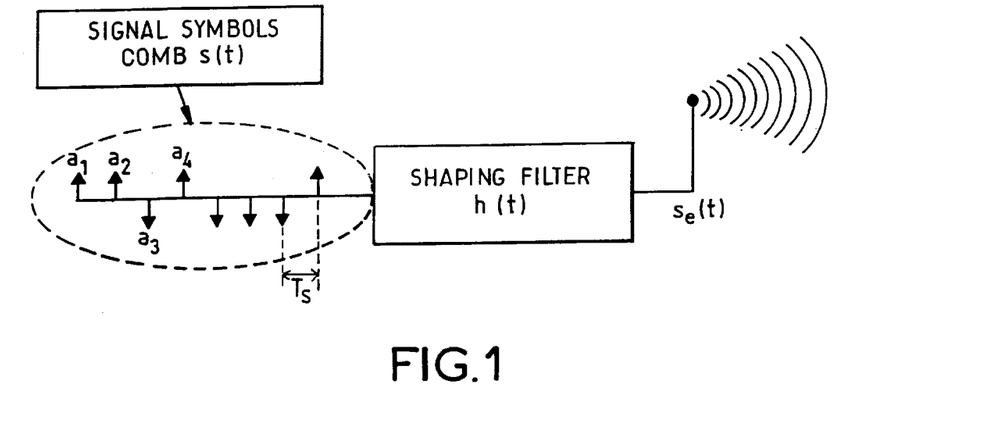
FIGS. 1 and 2, show the principle of transmission and reception of a linear modulation according to the prior art.

FIG. 1 gives a diagrammatic view of the principle of the method.

The example given in this patent relates chiefly to the GSM standard in which the signal sent is a GMSK (Gaussian Minimum Shift Keying) phase modulation such that:

$$s_e(t) = \exp\left\{ j \sum_n \Phi(t - nT_s) a_n \right\} \quad (2)$$

where $a_n$ corresponds to a symbol sent at a rate of $T_s$ samples per symbol.

In order that the GMSK standard may form part of the linear modulations, the authors of this patent have made the following approximation:

$$s_e(t) \approx \sum_n C_0(t - nT_s) j^n b_n \text{ with } b_n = \prod_{k=-\infty}^{n} a_k \quad (3)$$

The linearization is obtained, for example, by applying the method described in reference of Pierre Andre Laurent, "Exact and approximate construction of digital phase modulations by superposition of modulated pulse (AMP)" in IEEE Trans. on Communications Vol 34 (1986) pp 150–160.

In the sequence of symbols $\{a_n\}$, there is a sequence of symbols $\{s_k\}$ such that $a_{p+k-1} = \{s_k\}$ for $1 \leq k \leq K$. The sequence of symbols $\{s_k\}$ is defined by the transmission standard and is called a learning sequence. In particular, the GSM standard comprises eight different sequences formed by K=26 symbols.

Figure 2:
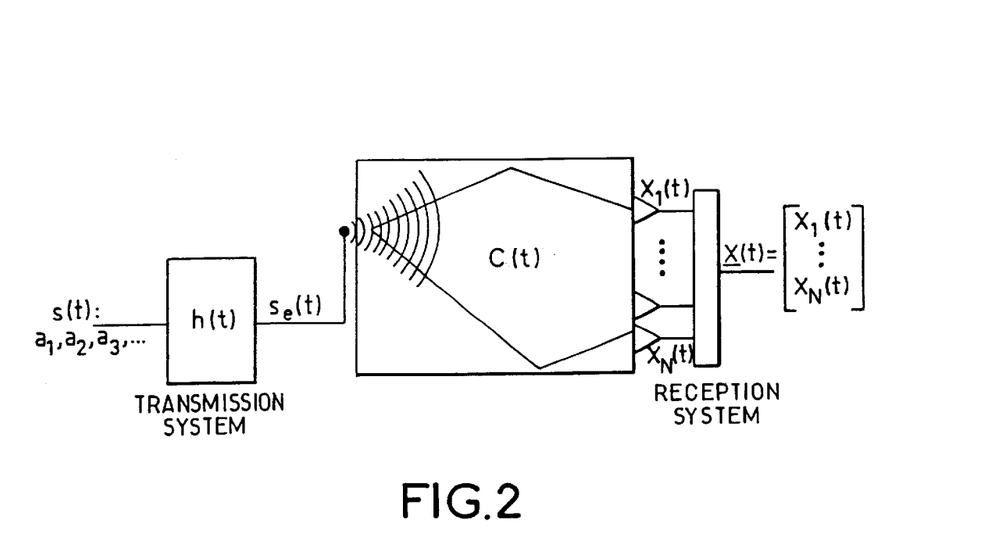

The signal $s_e(t)$ travels in transit towards the $n^{th}$ antenna of a reception system through an FIR linear filter propagation channel C(t). Under these conditions, there is a relationship of linear filtering between the comb of symbols s(t) (such that $s_e(t) = h(t)*s(t)$ where <<*>> designates the convolution product) and the sensor signals $x_n(t)$, illustrated in FIG. 2.

Given that $C(t) = [C_1(t) \ldots C_N(t)]^T$, the relationship between the transmitted symbols $a_n$ and the received signal $\underline{x}(t)$ is expressed in the form:

$$\underline{x}(t) = C(t)*s_e(t) = (C*h(t))*s(t) = \sum_n G(t - nT_s) a_n + \underline{b}_0(t) \quad (4)$$

where for $t = nT_s$, $s(t) = a_n$ and for $t \neq nT_s$, $s(t) = 0$.

$G(t) = C(t)*h(t)$ is a N×1-sized vector and $\underline{b}(t)$ is the vector formed by the background noise of the N receivers.

The method disclosed in the patent FR 2 764 074 is subdivided into three steps:

$1^{st}$ step: Digitization of the signal received $\underline{x}(t)$ at the sampling period $T_e$. Since the input of the system is formed by symbols $\{a_n\}$, $T_e$ must be chosen so that $T_s = P T_e$ where P is an integer. Thus, if we write $G_{p-nP} = G((p-nP)T_e)$ the relationship (4) becomes:

$$\underline{x}(pT_e) = \sum_n G_{p-nP} a_n + \underline{b}_0(p T_e) \quad (5)$$

In the description of the patent, the authors write P=2. The fact of choosing the sampling period $T_e$ as a function of the symbol period $T_s$ is a is heavy constraint. Generally, the equipment cannot be used to obtain $T_s = P T_e$ (P integer) directly. The sampling is done at $T'_e$ and, thereafter, to have a sampling at $T_e$, it is necessary to carry out digital processing operations which resample the signal at $T_e$. In the GSM standard, the signals sent verify the relationship $1/T_s = 270$ kHz. To meet the conditions of the Shannon theorem at reception, the system receives them at $1/T_e = 500$ kHz and $T_s/T_e = 500/270$ is in fact a non-integer.

$2^{nd}$ step: Synchronization procedure: the goal is to determine the instant $t_0 = pT_e$ of appearance of the learning sequence $\{s_k\}$ such that $a_{p+k-1} = \{s_k\}$ for $1 \leq k \leq K$:

$$\underline{x}((k + p)T_e) = \sum_n G_{k-nP} s_n + \underline{b}_0((k + p)T_e) \quad (6)$$

To this end, it is considered that the symbol comb $s(n T_e)$ is the input signal and it is sought to maximize the following synchronization criterion in terms of $\tau$:

$$Cri(\tau) = \hat{r}_{xs}(\tau)^H R_{xx}^{-1}(\tau) \hat{r}_{xs}(\tau) \quad (7)$$

With $\hat{r}_{xs}(\tau) = \frac{1}{KP} \sum_{k=1}^{KP} \underline{x}(k T_e + \tau) s(k T_e)^*$ and -continued $$R_{xx}(\tau) = \frac{1}{KP}\sum_{k=1}^{KP} x(k\,T_e + \tau)x(k\,T_e + \tau)^H$$

K: number of symbols of the learning sequence and $s(n\,T_e)=s_{kP}$ for $n=kP$ and $s(n\,T_e)=0$ for $n \neq kP$ and where $\underline{x}^H$ designates the transposition and conjugate of $\underline{x}$.

$3^{rd}$ step: The signals $\underline{x}(t+t_k)$ and the symbol comb filters $s(n\,T_e)$ associated with a source are used in order to isolate this source and carry out a direction-finding operation on a single source at the instant $t_0=p\,T_e$. With the use of the received signal $\underline{x}(t+t_k)$ and a single symbol comb filter $s(n\,T_e)$, the method is said to be a single-user method.

While the prior art method performs well, it nevertheless has certain drawbacks. It can be applied to waveforms that can be linearized or that can be approximated in such a form, and in single-user contexts.

The method according to the invention relies on a novel approach that consists especially in exploiting the signal or reference sequence containing symbols proper to a standard used or to a given format for the signal, the received signal and the knowledge of the instance of arrival of the different reference sequences, to determine the coordinates of a source from a measurement of its incidence, this operation being commonly known as direction-finding.

In the description, the terms "transmitters", "users" or "useful transmitters" designate one and the same object.

SUMMARY OF THE INVENTION

The invention relates to a method of co-operative radio direction-finding in transmission in a system of radio direction-finding for a radiocommunications system comprising one or more transmission sources or transmitters, the transmitted signal comprising a reference sequence formed by a sequence of symbols $\{s_k\}$, the receiver comprising at least one array of several sensors coupled to a radio direction-finder. The invention is characterized in that it comprises at least the following steps:

a) determining the reference signal or signals $d_r(t)$ associated with a transmitter m from the symbols and from the modulation defined by the format of the signals, b) defining the instant of arrival $t_k$ of one or more reference signals, c) from the signal $\underline{x}(t)$ received at the sensors, the instants of arrival $t_k$ and the reference signal or signals $d_r(t)$ derived from the step a), determining the value or values of incidence of the signals for a given transmitter.

The step a) is reiterated as many times as there are transmitters $M_0$ in the system.

It may comprise a step for the separation of the transmitters $M_0$ through the estimation of the transfer matrix of the channel $H^u$ for the transmission of all the useful signals and by the extraction, from this matrix, of the transfer matrices $H_m^u$ of the channel associated with a useful transmitter m in order to determine the corresponding observation vector $\underline{x}^m(t)$.

The step c) is carried out by means of a direction-finding operation by whitening, implemented on the observation vectors $\underline{x}^m(t)$ or by projection.

The step a) may be performed on a duration $\delta t' > \delta t$, where $\delta t$ is the basic duration of the reference signal.

A spatial filter $W_m$ can be determined from the reference signal $d_m(t)$ of a transmitter m in order to deduce the signal $s_m(t)$ coming from the transmitter before applying a direction-finding step.

The method can be applied especially in radio communications systems for GSM or UMTS type signals.

The invention also relates to a radio direction-finding device comprising at least means adapted to implementing the steps of the above-mentioned method.

The object of the invention has the following advantages in particular:

the possibility of performing a direction-finding operation in a context that is wider (namely a single-user or multiple-user context and a single-path or multipath context) than the one offered by the prior art method.

through the choice of the working time span or observation time span, the possibility of improving the results of the direction-finding, through the modification, for example the lengthening, of the duration of the reference signals, the possibility of improving the results of the direction-finding operation, the possibility of localizing mobiles to make directional transmission toward each mobile, on the basis of the knowledge of the direction of arrival of signals from the mobiles whose direction has been located, the possibility of localizing mobiles or base stations in a context of spectrum control, the reduction of the transmission power at constant range or the increasing of the transmission range at constant power, and consequently the reduction of interference with respect to the other cells, the method is applied for different waveforms, without specific processing, through the use of whitening or projection techniques that enable a more efficient rejection of interference, the possibility of improving the direction-finding results.

BRIEF DESCRIPTION OF THE DRAWINGS

Other features and advantages of the invention shall appear from the following description, given by way of an illustration that in no way restricts the scope of the invention. The description is made with reference to the appended drawings, of which.

MORE DETAILED DESCRIPTION

The following description, given by way of an illustration that in no way restricts the scope of the invention, relates to a radio direction-finding device whose goal especially is to locate the direction of the sources on an aircraft and/or on the ground.

Figure 3:
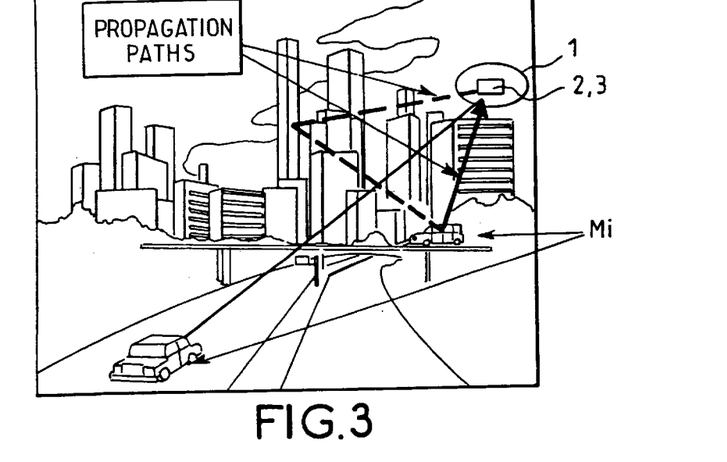
FIG. 3 shows a system of localization from a base station.

FIG. 3 gives schematic view of an exemplary system for the localizing of one or more mobiles Mi from a base station. The signals are propagated along direct paths (shown in solid lines in the figure) or along indirect paths (shown in dashes) as a result of the different reflections on obstacles.

Figure 4:
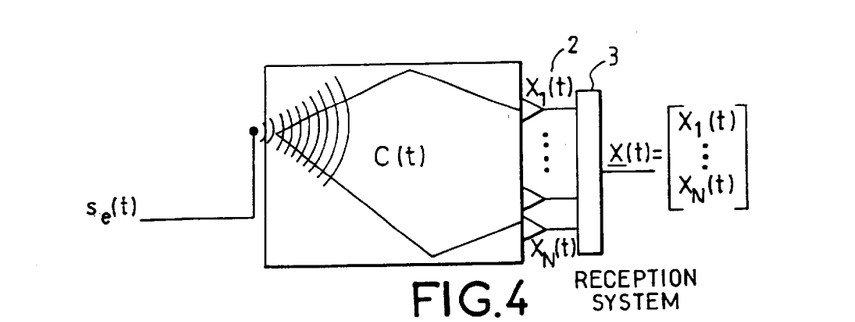
FIG. 4 is a diagrammatic view of the principle of transmission-reception according to the invention.

The base station 1 comprises for example an antenna array 2, behind which there is a system 3 for the reception of the signals coming from the antennas. A processor 4, adapted especially to the execution of the steps of the method according to the invention described in detail here below, is connected to the reception system FIG. 4 is a diagrammatic view of the principle of transmission-reception implemented in the method according to the invention. The elements identical to those of FIG. 2 bear the same references. The signal sent $s_e(t)$ gets propagated by a transmission channel $C(t)$ and is then received at the array of sensors of the base station.

Figure 5:
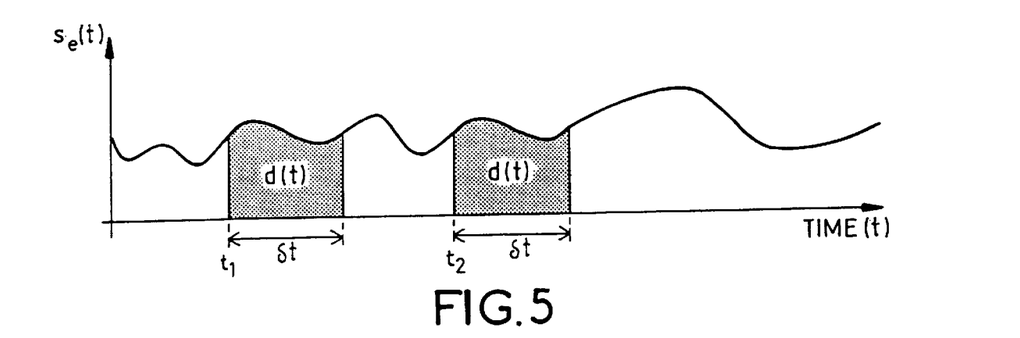
FIG. 5 shows the shape of a signal $s_e(t)$ transmitted by a source m comprising a reference signal $d(t)$.

The transmitted signal $s_e(t)$, an exemplary shape and structure of which are given in FIG. 5, comprises several reference signals $d(t)$ that appear several times at given instants $t_1, t_2 \ldots$. The reference signal $d(t)$ is formed, for example, by a sequence of symbols $\{s_k\}$ for $1 \leq k \leq K$, where K is the number of symbols of the sequence. The duration $\delta t$ of the reference signal $d(t)$ then depends on the number K, the symbol time $T_s$ and the sampling period $T_e$.

Step a) of the Method: Construction of the Reference Signal $d(t)$

In the method, the reference signal $d(t)$ is built from symbols of the learning sequence $\{s_k\}$, the symbol time $T_s$ corresponding to the transmitted signal, the sampling period $T_e$ and the modulation sent (the standard used for the signals, which may be the waveform $h(t)$ in the case of the linear modulations).

In the case of multiple users, with $M_0$ users or useful transmitters, the step a) is reiterated as many times as there are users, in order to determine the reference signals $d_1(t) \ldots d_{M_0}(t)$ for each of them. This makes it possible to obtain a multiple-user direction-finding by using the presence of the $M_0$ reference signals between the instants $t_k$ and $t_k+\delta t$ where $\delta t$ is the duration of the reference signals.

For example, for the GSM signals, the reference $d(t)$ is computed by using the above-mentioned expression (2).

For UMTS type signals, the method determines the reference sequence $d(t)$ from spread-spectrum sequences known to those skilled in the art and from the expression (1) where $h(t)$ is a Nyquist filter with a roll-off value of 0.25.

This step a) is followed, for example, by a step for the digitization of the received signal $\underline{x}(t)$ at the sampling period $T_e$. In this step, it is not necessary to choose $T_e$ such that $T_s=PT_e$ where P is an integer.

Step b) or Synchronization Step

The next step consists in determining, in the received signal $\underline{x}(t)$, the instants $t_1, t_2$ etc of the appearance of the reference signal $d(t)$ such that, according to the relationship (4):

$$\underline{x}(t+t_k) = \sum_n C(t)d(t-nT_e) + \underline{b}_0(t+t_k) \quad (8)$$

for $0 < t < \delta t$ because $\underline{x}(t)=C(t)*s_e(t)+\underline{b}_0(t)$ and $s_e(t+t_k)=d(t)$ for $0<t<\delta t$. For this purpose, the method considers that the reference signal $d(t)$ is the input signal and seeks to maximize the following synchronization criterion in terms of $\tau$:

$$Cri(\tau) = \hat{r}_{xd}(\tau)^H R_{xx}^{-1}(\tau)\hat{r}_{xd}(\tau)$$

$$Cri(\tau) = \hat{r}_{xd}(\tau)^H R_{xx}^{-1}(\tau)\hat{r}_{xd}(\tau) \quad (9)$$

$$\text{with } \hat{r}_{xd}(\tau) = \frac{1}{\delta t}\sum_{t=0}^{\delta t} \underline{x}(t+\tau)d(t)^* \text{ and}$$

$$R_{xx}(\tau) = \frac{1}{\delta t}\sum_{t=0}^{\delta t} \underline{x}(t+\tau)\underline{x}(t+\tau)^H$$

Step c) Determining of the Directions of Arrival or Direction-finding

The signals $\underline{x}(t+t_k)$ and $d(t)$ associated with a source m are used in order to isolate it and carry out a direction-finding operation on a single source at a given point in time $t_k$.

The implementation of the step c) depends especially on the context of use, for example in the single-user or multiple-user framework. The description differentiates between these two cases.

Application of the Method in the Single-user Case

In the method, first of all a search is made for the instants of synchronization at $t_k=pT_e$ for example by using the method described in the patent FR 2 715 488. Given the different synchronization instants and the instants of appearance $t_k$ of the learning sequence, the direction-finding is obtained, in the method, for example according to a MUSIC type method, known to those skilled in the art, on the reconstructed, modulated signal $d(t)$ obtained from the step a) and the observations $\underline{x}(t+t_k)$ on the time interval $0 \leq t \leq \delta t$. A method such as this is described, for example, in R. O. Schmidt, "A signal subspace approach to multiple emitters location and spectral estimation", PhD Thesis, Stanford University, CA, November 1981].

Application of the Method in the Multiple-user Case

In a more general context, it may be desired to make a search, in the received signal $\underline{x}(t)$, for several sources which are associated with reference signals $d_i(t)$ different from one another. In GSM, for example, the idea is to search for the sources associated with the eight possible TSC sequences, $1 \leq i \leq 8$. Hence, the synchronization instants associated with the $i^{th}$ synchronization $d_i(t)$ will be called $t_k(i)$.

Search for the Number $M_0$ of Useful Transmitters or Useful Units

In the method, a search will be made initially for the number $M_0$ of useful transmitters. To illustrate the process implemented, the description considers the case where there are two useful units or transmitters.

Figure 6:
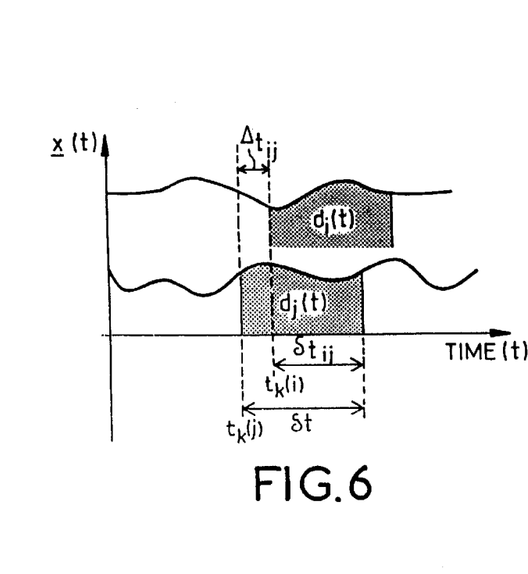
FIG. 6 shows the result of the sync operation in a multiple-user context.

FIG. 6 shows the presence of two reference signals $d_i(t)$ and $d_j(t)$ which are detected at the respective instants $t_k(i)$ and $t_k(j)$ and correspond to two users and two transmitters.

If the difference $\Delta t_{ij}=t_k(j)-t_k(i)$ is small enough, for example $\Delta t_{ij}<\alpha\delta t$ (typically $\alpha \approx 0.1$), a multiple-user algorithm can be applied (for example by implementing a multiple-user direction-finding technique) by using the signals $d_i(t)$ and $d_j(t)$ in the model of the equation (16) between the instants $t_k(i)$ and $t_k(j)+\delta t$, namely the time period or signal section where the two users are present. According to the expression (6), the signal $\underline{x}(t+t_k(i))$ is written as follows:

$$\underline{x}(t+t_k(i)) = \sum_{n=-L/2}^{L/2} C_i(t)d_i(t-nTe) + \qquad (10)$$

$$\sum_{n=-L/2}^{L/2} C_j(t+\Delta t_{ij})d_j(t+\Delta t_{ij}-nT_e) + \underline{b}^2(t)$$

for $0 < t < \delta t_{ij}$ where $\delta t_{ij}$ corresponds to the signal section used for the processing, in multiple-user mode, of the $i^{th}$ and the $j^{th}$ signals.

Where $\underline{b}^2(t)$ is a noise formed by the background noise $\underline{b}_0(t)$ and interferers having no synchronization signal, close enough to the instants $t_k(i)$ and $t_k(j)$. This expression can also be expressed in the following form (11)

$$\underline{x}(t+t_k(i)) = \underbrace{\left[\sum_{m=1}^{M_0} H^u_m \underline{r}^m_L(t)\right]}_{\text{Useful transmitters}} + \underbrace{\underline{b}^{MO}(t)}_{\text{Background noise + Interferers}} \quad \text{for } 0 < t < \delta t_{ij}$$

Where $H_m^u$ represents the matrix of the propagation channel for the useful transmitter m and $\underline{r}^m_L(t)$ is its reference vector.

For $M_0=2$, the values $H_m^u$ and the values $\underline{r}^m_L(t)$ verify:

$$\underline{r}^1_L(t) = \begin{bmatrix} d_1(t-(L/2)Te) \\ \cdot \\ d_1(t+(L/2)Te) \end{bmatrix} \text{ and } \underline{r}^2_L(t) = \begin{bmatrix} d_2(t+\Delta t_{12}-(L/2)Te \\ \cdot \\ d_2(t+\Delta t_{12}+(L/2)Te \end{bmatrix} \quad (12)$$

and $H_1^u=[C_1(t-(L/2)T_e) \ldots C_1(t+(L/2)T_e)]$ $H_2^u=[C_2(t-(L/2)T_e+\Delta t_{12}) \ldots C_2(t+(L/2)T_e+\Delta t_{12})]$ (13)

Where L is the number of time shifts of the reference signal. The optimal procedure, for example, would be to choose L so that it is equal to the temporal spread of the channel of the transmitter with the greatest spread.

More generally, the number of useful transmitters $M_0$ is equal to the number of instants $t_k(i)$ belonging to the time interval $[t_0 t_0 + \Delta t_{ij}[$, where $\Delta t_{ij}=\alpha\delta t$. The value of α is typically $\alpha \approx 0.1$ and δt is the duration of the synchronization signals.

Figure 7:
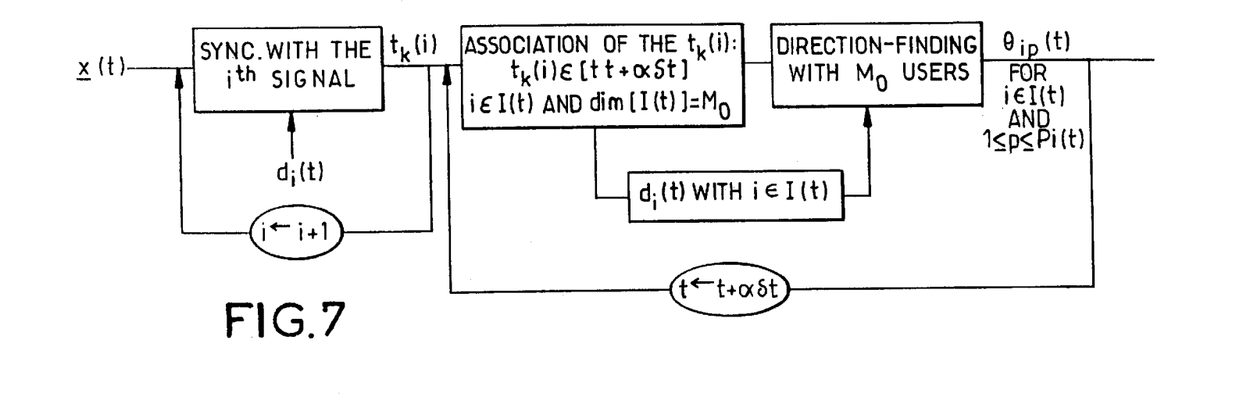
FIG. 7 is a block diagram showing the process of multiple-user detection and direction-finding.

The process of multiple-user direction-finding and detection is then illustrated in FIG. 7.

To put it briefly, the method in the case of a multiple-user context:

determines the different instants of synchronization $t_k(i)$ for all the signals i, determines the number of useful units or transmitters $M_0$, carries out the direction-finding operation for each useful unit (transmitter) $M_0$ in knowing the associated reference signal $d_i(t)$ and the instants of synchronization $t_k(i)$.

The direction-finding step is performed for example according to different methods, some of which are given here below by way of an indication that in no way restricts the scope of the invention. Before the direction-finding operation is implemented, the method entails an estimation of the different propagation channels and the separation of the useful transmitters.

For this purpose, the method considers the interferers correlated with the useful transmitter to be useful transmitters. The context is thus a multiple-user context with $M_0$ useful transmitters and $M-M_0$ interference transmitters.

After the separation of the useful transmitters, the expression of the signal $\underline{x}^m(t)$ received at the array of sensors and coming from the user is equivalent to that of the single-user mode and a single-user direction-finding algorithm can then be applied to this signal.

Thus, the signal received at the sensors is expressed as follows:

$$\underline{x}(t) = \sum_{m=1}^{M_0} H^u_m \underline{r}^m_L(t) + \underline{b}^{MO}(t) \qquad (14)$$

Where $\underline{b}^{MO}(t) = \sum_{m'=M_0+1}^{M} H_{m'} \underline{s}^{m'}_L(t) + b(t)$ The matrices representing the transmission channel $H_m^u$ and $H_{m'}$ have the following expression (15):

$$H^u_m = \sum_{p=1}^{P_m} \rho_{mp}\underline{a}(u_{mp})\underline{h}^{uT}_{mp} = A_m B^u_m \text{ and}$$

$$H_{m'} = \sum_{p=1}^{P_{m'}} \rho_{m'p}\underline{a}(u_{m'p})\underline{h}^T_{m'p} = A_{m'} B_{m'}$$

Where $A_m=[\underline{a}(u_{m1}) \ldots \underline{a}(u_{mPm})]$ is the matrix of the direction vectors of the multipaths of the $m^{th}$ transmitter, $B_m^{uT}=[\rho_{m1}\underline{h}_{m1}^u \ldots \rho_{mPm}\underline{h}_{mPm}^u]$ and $B_{m'}^T=[\rho_{m'1}\underline{h}_{m'1} \ldots \rho_{m'Pm'}\underline{h}_{m'Pm'}]$, $u_{mp}$ is the incidence of the $p^{th}$ path of the $m^{th}$ user. The expression (14) of $\underline{x}(t)$ can be written as follows:

$$\underline{x}(t)=H_u \underline{r}^u_L(t)+\underline{b}^{m0}(t) \qquad (16)$$

where $H_u$ represents the matrix of the propagation channels of the $M_0$ useful transmitters and $\underline{r}^u_L(t)$ represents the associated multiple-user reference vector.

with $H_u = [H^u_1 \ldots H^u_{M_0}]$ $$\text{and } \underline{r}^u_L(t) = \begin{bmatrix} \underline{r}^1_L(t) \\ \cdot \\ \underline{r}^{M_0}_L(t) \end{bmatrix} = \begin{bmatrix} d_1(t-(L/2)Te) \\ \cdot \\ d_1(t+(L/2)Te) \\ \cdot \\ d_{M_0}(t-(L/2)Te) \\ \cdot \\ d_{M_0}(t+(L/2)Te) \end{bmatrix}$$

The exponent u refers to the transmitters known as useful transmitters and L corresponds to the number of time shifts of the reference signal. The optimal way would be to choose L so that it is equal to the temporal spread of the channel of the transmitter with the greatest spread.

The goal of the multiple-user technique consists firstly in separating the $M_0$ useful signals to then apply a single-user type technique to each of the useful transmitters.

Separation of the Transmitters or Useful Transmitters

The separation of the transmitters consists in estimating the transfer matrix $H_u=[H_1^u \ldots H_{M_0}^u]$ and then extracting the matrices $H_m^u$, associated with each of the $M_0$ useful transmitters, from $H_u$. The method estimates the matrix $H_u$ according to the least error squares method as in the single-user case. Thus, according to the expression (16), the method estimates $H_u$ in minimizing the difference between $H_u \underline{r}^u_L(t)$ and $\underline{x}(t)$. By obtaining this least error square value between the instants $t_{min}$ and $t_{max}$ we get:

$$\hat{H}_u = \hat{R}^u_{xr}(\hat{R}^u_{rr})^{-1} \tag{17}$$

with $\hat{R}^u_{xr} = \dfrac{1}{t_{max} - t_{min}} \displaystyle\sum_{t=t_{min}}^{t_{max}} \underline{x}(t)\, \underline{r}^u_L(t)^H$ and $\hat{R}^u_{rr} = \dfrac{1}{t_{max} - t_{min}} \displaystyle\sum_{t=t_{min}}^{t_{max}} \underline{r}^u_L(t)\, \underline{r}^u_L(t)^H$ Writing $\underline{b}^{MO}(t) = \underline{x}(t) - H_u \underline{r}^u_L(t)$ it is deduced from this that the covariance matrix of this noise+interferers vector is equal to:

$$\hat{R}^u_{bb} = \dfrac{1}{t_{max} - t_{min}} \displaystyle\sum_{t=t_{min}}^{t_{max}} \underline{b}^{MO}(t)\underline{b}^{MO}(t)^H \tag{18}$$

$$= \hat{R}_{xx} - \hat{H}_u \hat{R}^{uH}_{xr} = \hat{R}_{xx} - \hat{R}^u_{xr}(\hat{R}^u_{rr})^{-1}\hat{R}^{uH}_{xr}$$

with $\hat{R}_{xx} = \dfrac{1}{t_{max} - t_{min}} \displaystyle\sum_{t=t_{min}}^{t_{max}} \underline{x}(t)(\underline{x}(t))^H$ $$\hat{R}^u_{bb} = \hat{R}_{xx} - \hat{R}^u_{xr}(\hat{R}^u_{rr})^{-1}\hat{R}^{u\dagger}_{xr}$$

Since the matrices $\hat{H}^u_m$ are sub-blocks of the matrix $\hat{H}_u$, when $\hat{H}_u = [\hat{H}^u_1 \ldots \hat{H}^u_{M0}]$ is verified, they are extracted directly from $\hat{H}_u$ by the selection of the right columns. Thus, the useful signals have been separated and the covariance matrix $\hat{R}^u_{bb}$ of the noise+interferers component has been estimated. It is observed that, to estimate the matrices $\hat{R}^u_{bb}$ and $\hat{H}^u_m$, the matrix $\hat{R}^u_{rr}$, which is the covariance matrix of the vector $\underline{r}^u_L(t)$, is brought into play. This matrix, according to (16), has the following structure:

$$\hat{R}^u_{rr} = \begin{bmatrix} \hat{r}_{11}(0) & \cdot & \hat{r}_{11}(L)^* & & \hat{r}_{M_01}(L)^* \\ \cdot & \cdot & & & \\ \hat{r}_{11}(L) & \hat{r}_{11}(0) & & & \\ \cdot & & \cdot & & \cdot \\ \hat{r}_{M_01}(0) & \cdot & \hat{r}_{M_01}(-L) & & \hat{r}_{M_0M_0}(0) \\ & & \cdot & & \\ \hat{r}_{M_01}(L) & \cdot & \hat{r}_{M_01}(0) & \cdot & \hat{r}_{M_0M_0}(L_T) & \cdot & \hat{r}_{M_0M_0}(0) \end{bmatrix} \tag{19}$$

It can be seen that the matrix brings into play intercorrelation terms $\hat{r}_{ij}(T)$ between the reference signals $d_i(t)$ and $d_j(t-T)$ such that:

$$\hat{r}_{ij} = \dfrac{1}{t_{max} - t_{min}} \displaystyle\sum_{t=t_{min}}^{t_{max}} d_i(t) d_j(t-T)^* \tag{20}$$

Thus, the multiple-user method makes use of the coefficients of correlations $\hat{r}_{ij}(T)$ between the reference signals which are not necessarily zero. This point means that it is possible to intuitively verify that the use of the coefficients $\hat{r}_{ij}(T)$ is necessary to separate the reference signals $d_i(t)$ and $d_j(t)$ in the correlated case.

From the knowledge of the transfer matrix $H^u_m$ of the $m^{th}$ useful transmitter, it is possible to build up an observation vector $\underline{x}^m(t)$, the other useful transmitters having been rejected. The following transformation is carried out according to (14):

$$\underline{x}^m(t) = \underline{x}(t) - \sum_{m' \ne m} H^u_{m'} \underline{r}^{m'}_L(t) \tag{21}$$

$$\Downarrow$$

$$\underline{x}^m(t) = H^u_m \underline{r}^m_L(t) + \underline{b}^{MO}(t)$$

The expression of the signal $\underline{x}^m(t)$ is equivalent to that of the single-user case where $M_0 = 1$ and the method applies a single-user direction-finding algorithm to the signal $\underline{x}^m(t)$. Two examples of this algorithm are given here below by way of an illustration that in no way restricts the scope of the invention.

Direction-finding by Whitening

It being known that the transfer matrix is equal to $H^u_m = A_m B^u_m$ and assuming that $\underline{r}^u_L(t)$ and $\underline{b}^{MO}(t)$ are decorrelated, the covariance matrix $R^m_{xx}$ of the signal $\underline{x}^m(t)$ has the following structure according to the expressions (21) and (15):

$$R^m_{xx} = E[\underline{x}^m(t)\underline{x}^m(t)^H] = A_m R^u_{sm} A^H_m + R^u_{bb} \tag{22}$$

with $$R^u_{sm} = B^u_m E[\underline{r}^m_L(t)\underline{r}^m_L(t)^H] B^{uH}_m$$

Where $R^u_{bb}$ is the covariance matrix of the signal $\underline{b}^{MO}(t)$ whose expression is that of the formula (18). The matrix $A_m$ is constituted by the direction vectors $\underline{a}(u_{mp})$ of the $p^{th}$ path of the $m^{th}$ useful transmitter. Since $R^u_{bb}$ is different from $\sigma^2 I$ and since this matrix is known, the MUSIC method is applied by whitening the observations $\underline{x}^m(t)$ by the matrix $R^u_{bb}$. According to (21) the matrix $R^m_{xx}$ can be written as follows:

$$R^m_{xx} = H^u_m R^m_{rr} H^{uH}_m + R^u_{bb} \text{ with } R^m_{rr} = E[\underline{r}^m_L(t)\underline{r}^m_L(t)^H] \tag{23}$$

Under these conditions the following are the steps of the algorithm:

$1^{st}$ step: Computation of $\hat{R}_{xx} = E[\underline{x}(t)\,\underline{x}(t)^H]$, $\hat{R}^u_{xr} = E[\underline{x}(t)\,\underline{r}^u_L(t)^H]$ and $\hat{R}^u_{rr} = E[\underline{r}^u_L(t)\,\underline{r}^u_L(t)^H]$ $2^{nd}$ step: Computation of the transfer matrix $\hat{H}_u = \hat{R}^u_{xr}(\hat{R}^u_{rr})^{-1}$ $3^{rd}$ step: Extraction of the estimated matrices of the propagation channels for each of the transmitters m $\hat{H}^u_m$ for $1 \le m \le M_0$ of the matrix $\hat{H}_u$, given that $\hat{H}_u = [\hat{H}^u_1 \ldots \hat{H}^u_{M0}]$ $4^{th}$ step: Computation of the noise matrix $\hat{R}^u_{bb} = \hat{R}xx - \hat{R}^u_{xr}(\hat{R}^u_{rr})^{-1}\hat{R}^{uH}_{xr}$ For each transmitter or useful transmitter m with a transfer matrix $\hat{H}^u_m$, initialization is performed by m=1:

$5^{th}$ step: Computation of $\hat{R}^m_{xx} = \hat{H}^u_m \hat{R}^m_{rr} \hat{H}^{uH}_m + \hat{R}^u_{bb}$ with $\hat{R}^m_{rr} = E[\underline{r}^m_L(t)\,\underline{r}^m_L(t)^H]$ $6^{th}$ step: Whitening of $\hat{R}^m_{xx}$ by $\hat{R}^u_{bb}$ such that: $R^{bm}_{xx} = W^{1/2} \hat{R}^m_{xx} W^{-1/2H}$ with $\hat{R}^u_{bb} = W^{1/2} W^{1/2H}$ $7^{th}$ step: Application of MUSIC on $R^{bm}_{xx}$ with the direction vectors $\underline{a}^b(u) = W^{-1/2}\underline{a}(u)$ to estimate the incidences $u_{mp}$ for $1 \le p \le P_m$ of the multipaths of the $m^{th}$ transmitter.

$8^{th}$ step: m=m+1

$9^{th}$ step: if m≦$M_0$ return to the $5^{th}$ step.

At output, the method possesses the incidence values $u_{ip}(t_k(i))$ associated with the $k^{th}$ instants of the $p^{th}$ path of the $i^{th}$ reference signal of this source. The incidence values $u_{ip}(t)$ may be either azimuth values $\theta_{ip}(t)$ for a 1D direction-finding operation or they may be the pair of parameters $(\theta_{ip}(t), \Delta_{ip}(t))$ for a 2D direction-finding operation where $\Delta_{ip}(t)$ is the elevation angle.

Direction-finding by Projection

As in the single-user case, the method uses, for example, a method by projection. Indeed, given that $H_m{}^u = A_m B_m{}^u$, the expression of $\underline{x}^m(t)$ is as follows according to (21):

$$\underline{x}^m(t) = A_m B_m{}^u \underline{r}^m{}_L(t) + \underline{b}^{m0}(t) \quad (24)$$

where the matrix $A_m = [\underline{a}(u_{m1}) \ldots \underline{a}(u_{mPm})]$ is constituted by the direction vectors $a(u_{mp})$ of the multipaths of the $m^{th}$ useful transmitter. Given, according to (15) that $H_{m'} = A_{m'} B_{m'}$, the expression of the interference signals $\underline{b}^{M0}(t)$ of the expression (14) becomes $$\underline{b}^{M0}(t) = \sum_{m'=M_0+1}^{M} A_{m'} B_{m'} \underline{s}_L^{m'}(t) + b(t) = A_b^{M0} \underline{s}_b(t) + b(t) \quad (25)$$

where $A_b^{M0} = [A_{M0+1} \ldots A_M]$ is the matrix of the direction vectors of all the interference sources and $\underline{s}_b(t) = [\{B_{M0+1} \underline{s}^{M0+1}{}_L(t)\}^T \ldots \{B_M \underline{s}^M{}_L(t)\}^T]^T$ is the vector of the interference signals.

In the specific example of the use of the method in a multiple-user case, the steps of the algorithm for direction-finding by projection are the following:

$1^{st}$ step: Computation of $\hat{R}_{xx} = E[\underline{x}(t) \underline{x}(t)^H]$, $\hat{R}_{xr}{}^u = E[x(t) \underline{r}^u{}_L(t)^H]$ and $\hat{R}_{rr}{}^u = E[\underline{r}^u{}_L(t) \underline{r}^u{}_L(t)^H]$ $2^{nd}$ step: Computation of the transfer matrix of the propagation channel $\hat{H}_u = \hat{R}_{xr}{}^u (\hat{R}_{rr}{}^u)^{-1}$ $3^{rd}$ step: Extraction of the estimated matrices for the different propagation channels corresponding to the users or useful transmitters m $\hat{H}_m{}^u$ for $1 \leq m \leq M_0$ of the matrix $\hat{H}_u$ it being known $\hat{H}_u = [\hat{H}_1{}^u \ldots \hat{H}_{M0}{}^u]$ $4^{th}$ step: Computation of the noise matrix $\hat{R}_{bb}{}^u = \hat{R}_{xx} - \hat{R}_{xr}{}^u (\hat{R}_{rr}{}^u)^{-1} \hat{R}_{xr}{}^{uH}$ $5^{th}$ step: Application of MUSIC to $\hat{R}_{bb}{}^u$ and deduction of $A_b^{M0}$ $6^{th}$ step: Computation of $\Pi_b = I - A_b^{M0} (A_b^{M0H} A_b^{M0})^{-1} A_b^{M0H}$ For each Transmitter m with a Transfer Matrix $\hat{H}_m{}^u$. Initialization by m=1:

$7^{th}$ step: Computation of $\hat{R}_{xx}{}^M = \hat{H}_n{}^u \hat{R}_{rr}{}^m \hat{H}_m{}^{uH}$ with $\hat{R}_{rr}{}^m = E[\underline{r}^m{}_L(t) \underline{r}^m{}_L(t)^H]$ $8^{th}$ step: Computation of the matrix $R_{xx}{}^{um} = \Pi_b (\hat{R}_{xx}{}^m) \Pi_b$ $9^{th}$ step: Application of MUSIC to $R_{xx}{}^{um}$ with the direction vectors $\underline{a}_{pro}(u) = \Pi_b \underline{a}(u)$ to estimate the incidence values $u_{mp}$ pour $1 \leq P \leq p_m$ of the multipaths of the $m^{th}$ transmitter.

$10^{th}$ step: m=m+1

$11^{th}$ step: if m≦$M_0$ return to the $7^{th}$ step.

At the end of this step, the method possesses the incidence values $u_{ip}(t_k(i))$ associated with the $k^{th}$ instants of the $p^{th}$ path of the $i^{th}$ reference signal of this source. The incidence values $u_{ip}(t)$ may be either azimuth values $\theta_{ip}(t)$ for a 1D direction-finding operation or they may be the pair of parameters $(\theta_{ip}(t), \Delta_{ip}(t))$ for a 2D direction-finding operation where $\Delta_{ip}(t)$ is the elevation angle.

Improvement of the Direction-finding Results

The steps that have been described here above may be improved. Generally, the direction-finding performance values are inversely proportional to the time duration $\delta t$ of the reference signal. Thus, for a time duration of the learning signal $\delta t'$ equal to $\alpha \delta t$, the precision of the direction-finding is $\sqrt{\alpha}$ more precise.

Figure 8:
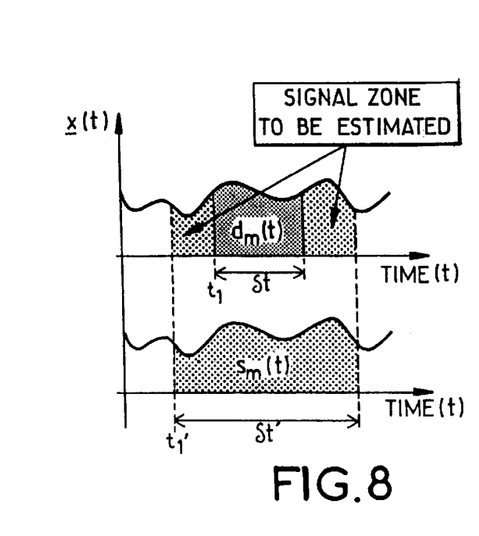
FIG. 8 is a drawing showing the lengthening of the duration of the reference signal.

The method then comprises a step in which the duration of the reference signal is increased. As can be seen in FIG. 8, the method consists of the deduction, from the observed signal $\underline{x}(t)$, of a reference signal $s_m(t)$ with a greater duration $\delta t'$ such that $\delta t' > \delta t$.

This value $\delta t'$ is determined for example as a function of the standard used.

For example, in the GSM standard, the eight TSC signals have a duration $\delta t = 96\ \mu s$ and the duration of a burst from a user is $\delta t' = 577\ \mu s$: At best, it is possible to have a ratio $\alpha = \delta t'/\delta t = 6$ and thus have more precise direction-finding values $\sqrt{\alpha} = 2.5$.

To obtain this result, this method implements the following steps:

Determining the Reference Sequence

Step a) is executed in considering a time duration $\delta t' > \delta t$ in order to obtain one or more reference signals $d_m(t)$ for one or more useful transmitters m.

Determining a Spatial Filter

From the reference signal $d_m(t)$ with a specified duration $\delta t$ determined at the step a) and from the signal $\underline{x}(t)$ received by the sensors, the method determines a spatial filter Wm such that $d_m(t) = W_m \underline{x}(t)$

Determining the Signal $s_m(t)$

To determine the signal $s_m(t)$ with the duration $\delta t'$, first of all a spatial filtering is conducted on the basis of the learning sequence $d_m(t)$ to obtain an estimate $\hat{s}_m(t)$ of the signal $s_m(t)$ with a duration $\delta t'$. Given that $\hat{s}_m(t)$ is not exactly equal to $s_m(t)$, it is possible to envisage its conversion into a signal $\hat{s}_m(t)$ close to $s_m(t)$.

Depending on the characteristics of the received signal, the method makes the following improvements:

(a) Demodulation of $\hat{s}_m(t)$ for the digital signals: Given that, in most cases, the characteristics of the intercepted digital signals are known, for example for the GSM, the UMTS, one alternative is to demodulate the signal $\hat{s}_m(t)$ and then remodulate the symbols detected and obtain the signal $\hat{s}_m(t)$.

(b) Case of the signals with constant modulus: Given that these signals have a constant modulus equal to 1, $|s_m(t)| = 1$, the method builds a reference signal $\hat{s}_m(t)$ as follows: $\hat{s}_m(t) = \exp(j\ \text{angle}(\hat{s}_m(t)))$ where angle(z) designates the argument of the complex z. According to the expression (2), this principle can be applied in GSM mode because the symbols are modulated in a phase modulation which is the GMSK.

(c) Case of any signals: In these conditions, the usable reference sequence can only be $\hat{s}_m(t)$ such that $\hat{s}_m(t) = \hat{s}_m(t)$

Determining of the Spatial Filter of the Signal $s_m(t)$

In the presence of $M_0$ useful signals, the signal $\underline{x}(t)$ received at the N sensors of the array is written as follows (26):

$$\underline{x}(t) = \sum_{m=1}^{M_0} H_m^u \underline{r}_L^m(t) + \underline{b}^{M_0}(t) = H^u \underline{r}_L^u(t) + \underline{b}^{M_0}(t) \text{ for } t_1 \leq t \leq t_1 + \delta t$$

$$\text{where } \underline{r}_L^u(t) = \begin{bmatrix} \underline{r}_L^1(t) \\ . \\ \underline{r}_L^{M_0}(t) \end{bmatrix} \text{ and } \underline{r}_L^m(t) = \begin{bmatrix} d_m(t - (L/2)Te) \\ . \\ d_m(t + (L/2)Te) \end{bmatrix}$$

The signal $d_m(t)$ is the learning signal of the $m^{th}$ transmitter for $t_1 \leq t \leq t_1+\delta t$. The reference vector $\underline{r}_L^u(t)$ therefore consists of the reference signals $d_m(t-k)$ of the $M_0$ useful signals. Assuming that the $m^{th}$ transmitter sends a signal $s_m(t)$ as in FIG. 8, the following is deduced from this, for all the instants t:

$$\underline{x}(t) = H_u \underline{s}_L^u(t) + \underline{b}^{M_0}(t) \tag{27}$$

$$\text{where } \underline{s}_L^u(t) = \begin{bmatrix} \underline{s}_L^1(t) \\ . \\ \underline{s}_L^{M_0}(t) \end{bmatrix} \text{ and } \underline{s}_L^m(t) = \begin{bmatrix} s_m(t - (L/2)Te) \\ . \\ s_m(t + (L/2)Te) \end{bmatrix}$$

From the relationship (26), the method determines the space-time filter W enabling the estimation of $\underline{r}_L^u(t)$ from $\underline{x}(t)$. According to (27), this same filter is used to estimate the signal $\underline{s}_L^u(t)$ from $\underline{x}(t)$. In the absence of noise and interferers, W verifies: $\underline{s}_L^u(t) = W \underline{x}(t)$. Thus, W is estimated from the equation (26) in minimizing the difference between $W \underline{x}(t)$ and $\underline{r}_L^u(t)$ for $t_1 \leq t \leq t_1 + \delta t$:

$$\hat{W} = \hat{R}_{rx}^u (\hat{R}_{xx}^u)^{-1} \tag{28}$$

$$\text{with } \hat{R}_{rx}^u = \frac{1}{\delta t} \sum_{t=t_1}^{t_1+\delta t} \underline{r}_L^u(t)\underline{x}(t)^H \text{ and } \hat{R}_{xx}^u = \frac{1}{\delta t} \sum_{t=t_1}^{t_1+\delta t} \underline{x}(t)\underline{x}(t)^H$$

From this value, an estimate $\hat{\underline{s}}_L^u(t)$ of the reference vector $\underline{s}_L^u(t)$ is then deduced for $t_1' \leq t \leq t_1' + \delta t'$ verifying:

$$\hat{\underline{s}}_L^u(t) = \hat{W}\underline{x}(t) \text{ for } t_1' \leq t \leq t_1' + \delta t' \tag{29}$$

$$\text{where } \hat{\underline{s}}_L^u(t) = \begin{bmatrix} \hat{\underline{s}}_L^1(t) \\ . \\ \hat{\underline{s}}_L^{M_0}(t) \end{bmatrix} \text{ and } \hat{\underline{s}}_L^m(t) = \begin{bmatrix} \hat{s}_m(t - (L/2)Te) \\ . \\ \hat{s}_m(t + (L/2)Te) \end{bmatrix}$$

The signal $\hat{s}_m(t)$ is the estimated reference sequence of the $m^{th}$ transmitter on a duration $\delta t'$. As indicated at the beginning of this section, this estimation $\hat{s}_m(t)$ could be refined by being converted into a signal $\hat{s}_m(t)$.

Conversion of a Multiple-source Case into a Multiple-user Case

Figure 9:
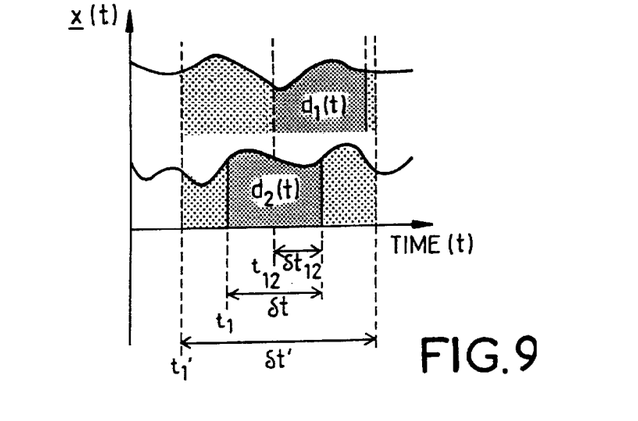
FIGS. 9 and 10 show two examples of implementation in the multiple-user case.

FIG. 9 represents the time range in which the multiple-user algorithm is applicable. This corresponds to a duration $\delta t_{12}$ smaller than the duration $\delta t$ of the sequences demarcated by the instants $t_{12}$ and $t_{12} + \delta t_{12}$.

Figure 10:
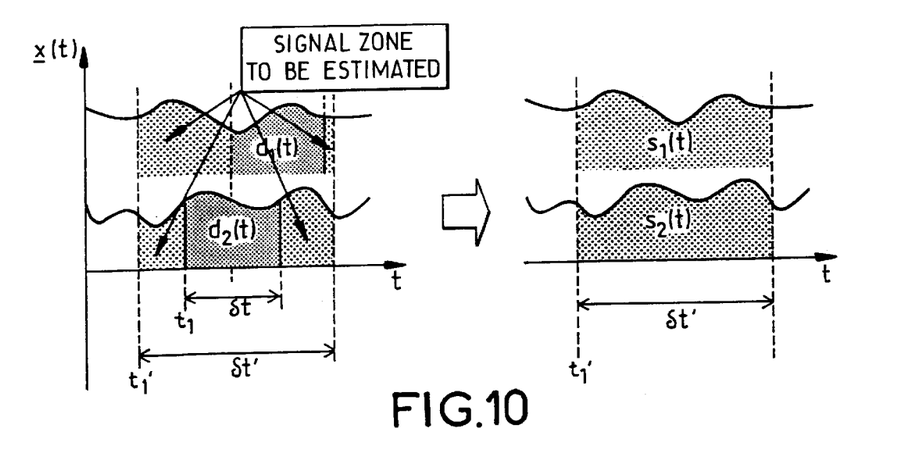

To be able to apply the multiple-user algorithm without reducing the duration of the reference signals, it is therefore necessary to estimate the sequences $\hat{s}_1(t)$ and $\hat{s}_2(t)$ of FIG. 10.

First of all, the signals $\hat{s}_m(t)$ will be estimated in single-user mode for $1 \leq m \leq M_0$ from the observations $\underline{x}(t)$ and the reference signal $d_m(t)$ such that $\underline{r}_L^u(t) = \underline{r}_L^m(t)$. The signals $\hat{s}_m(t)$ are therefore estimated independently. As indicated here above, the $M_0$ estimations could be refined by being converted into signals $\hat{s}_m(t)$.

EXAMPLES OF IMPLEMENTATION OF THE METHOD ACCORDING TO THE INVENTOIN

Figure 11:
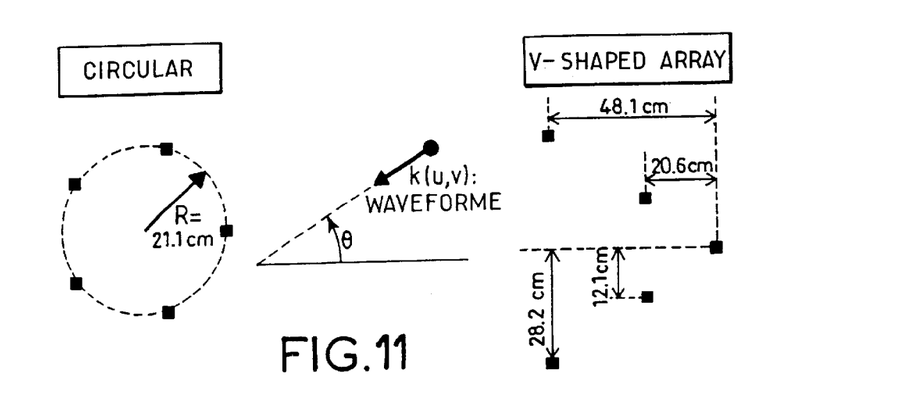
FIGS. 11, 12, 13 and 14 show results of trials.

FIG. 11 shows the results obtained with two plane arrays of N=5 sensors, comprising one circular array with a radius of R=21.1 cm and one "V" shaped array. The azimuth $\theta$ is the incidence of a source in the plane of the array and the elevation angle $\Delta$ is the incidence with respect to the perpendicular of the plane of the array. For the simulations in ($\theta$, $\Delta$), the direction-finding is done according to the parameters (u,v) which are the components of the wave vector of the source in the plane of the array. This components may be expressed in the form:

$$u = \cos(\Delta)\cos(\theta) \text{ and } v = \cos(\Delta)\sin(\theta) \tag{30}$$

The two arrays are adapted to the frequency range 900 MHz–1 GHz of the GSM. In the simulations, the center frequency is equal to $f_{ant} = 900$ Mhz and thus the wavelength is equal to $\lambda = c/f_{ant} = 33.33$ cm.

The direction-finding performance characteristics will then be estimated, either with respect to the parameter $\theta$ or with respect to the parameters (u,v) depending on whether it is a 1D or a 2D direction-finding operation that is performed. These performance characteristics are computed in terms of MSE (mean square error) of the parameter $\theta_m$ or $(u_m, v_m)$ for the $m^{th}$ source. For this purpose, several operations of direction-finding are carried out to find the direction of the source having the incidence $\theta_m$ or $(u_m, v_m)$ to estimate the incidence $\hat{\theta}_m(k)$ or $(\hat{u}_m(k), \hat{v}_m(k))$ at the $k^{th}$ iteration. At each iteration, the same signal configuration is kept while, at the same time, the noise and the symbols of the incident signals are drawn randomly. Consequently, for a source with an incidence $\theta_m$ or $(u_m, v_m)$, the computations of the MSE in 1D and 2D direction-finding are the following:

1D direction-finding in $\theta$:

$$\Delta \theta_{EQM}^m = \sqrt{\frac{1}{nb} \sum_{k=1}^{nb} (\hat{\theta}_m(k) - \theta_m)^2}$$

2D direction-finding in (u,v):

$$\Delta R_{EQM}^m = \sqrt{\frac{1}{nb} \sum_{k=1}^{nb} (\hat{u}_m(k) - u_m)^2 + (\hat{v}_m(k) - v_m)^2}$$

where nb designates the number of iterations to compute the MES values: the MES of the $m^{th}$ source is parametrized by $\Delta \theta_{EQM}^m$ for the 1D direction-finding and by $\Delta R_{EQM}^m$ for the 2D direction-finding.

Figure 12:
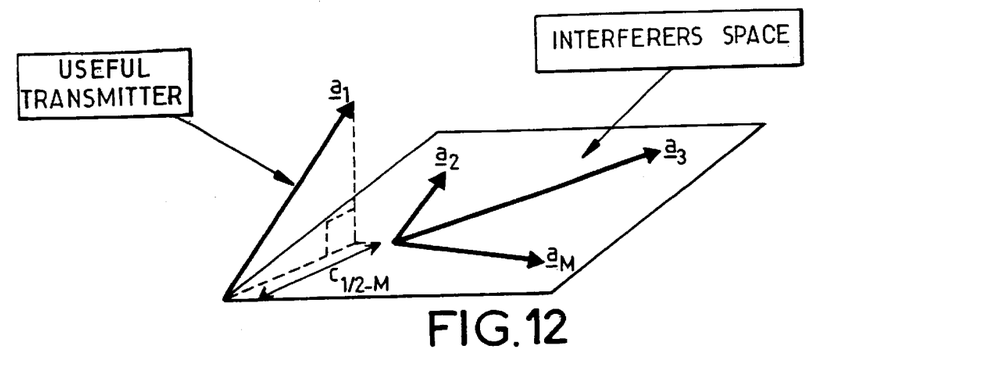

Finally, a spatial distance must be set up between a useful transmitter with an incidence $\theta_m$ or $(u_m, v_m)$ and interferers with an incidence $\theta_m$ or $(u_m, v_m)$ for $2 \leq m \leq M$. This distance depends on the direction vectors of the sources whose expression is given, for example, in R. O. Schmidt, "A signal subspace approach to multiple emitters location and spectral estimation", PhD Thesis, Stanford University, CA, November 1981. Taking $\underline{a}_m$ to denote the direction vector of the $m^{th}$ source, this distance is defined by the projection of the direction vector $\underline{a}_1$ of the useful transmitter on the space defined by those of the interferers $\underline{a}_2 \ldots \underline{a}_M$ such that:

The scalar $c_{1/2}$–Mthen has the following expression:

$$c_{1/2-M} = \sqrt{\frac{a_1^H \Pi_s(2, \ldots, M) a_1}{N}}$$

with $\Pi_s(2, \ldots, M) = A_{2-M}(A_{2-M}{}^H A_{2-M})^{-1} A_{2-M}{}^H$

Where $A_{2-M}=[\underline{a}_2 \ldots \underline{a}_m]$ and $\underline{a}_m{}^H \underline{a}_m = N$ for $1 \leq m \leq M$. In these conditions, the parameter $c_{1/2}$–Mcalled the spatial correlation coefficient varies between 0 and 1. When $c_{1/2}$–M=0 the useful transmitter is orthogonal to the plane of the interferers and is therefore spatially decorrelated from the interferers. However, when $c_{1/2}$–M=1 the useful transmitter is in the plane of the interferers and becomes spatially consistent with the interferers. These spatial correlation configurations between the useful transmitter and the interferers will have a major influence on the performance characteristics of the direction-finding operations (FIG. 12).

Examples of Simulations with the Signals of the GSM

In the simulations for this section, the signals $s_m(t)$ are the GMSK modulations of the GSM. Since the signal sent has a constant modulus, the signal $\hat{s}_m(t)$ is converted into $\hat{s}_m(t)$ by the method (b). As above, $\delta t=56$ is chosen to be in the configuration of the signals TSC with $f_e=600$ kHz. The duration of the new reference signal $s_m(t)$ will be lengthened to $\delta t'=200$ so that it corresponds to the approximate duration of a GSM burst. The signal is simulated on the circular array with $f_{ant}=900$ MHz. The direction-finding operations are performed in 1D and the incidence of the 1$^{st}$ source is equal to $\theta_1=45$ degrees.

Figure 13:
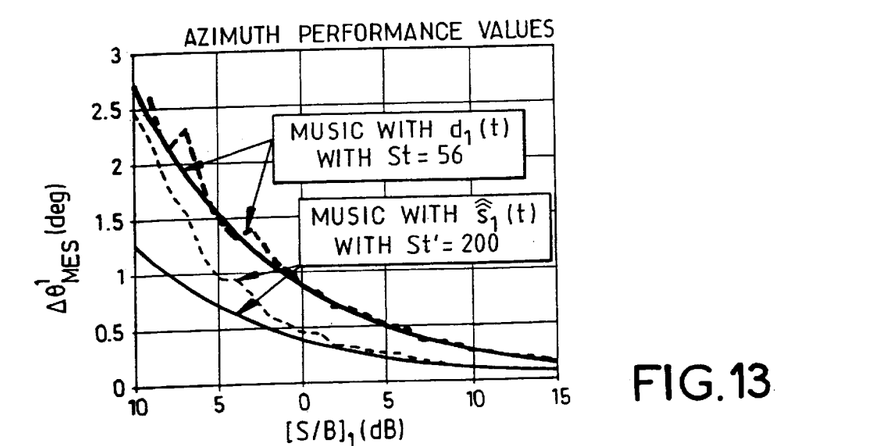

In FIG. 13, in the presence of only one source, the performance characteristics of the reference algorithms are compared with the signals $d_1(t)$ and $\hat{s}_1(t)$ having respective durations of $\delta t=56$ and $\delta t'=200$. The Cramer Rao bounds associated with these integration times are plotted in solid lines. The direction-finding precision $\Delta \theta^1_{MES}$ of the source is given as a function of its signal-to-noise ratio $[S/B]_1$.

It can be seen that the method with the known signal $d_1(t)$ follows the Cramer Rao bound while the reference method with the signal $\hat{s}_1(t)$ follows this bound beyond 0 dB. Thus, beyond 0 dB, the method with $\hat{s}_1(t)$ is $\sqrt{200/56}=1.88$ times more precise than the method with $d_1(t)$. Below 0 dB, the method with the reference sequence $\hat{s}_1(t)$ is more precise with a gain of less than 1.88.

Figure 14:
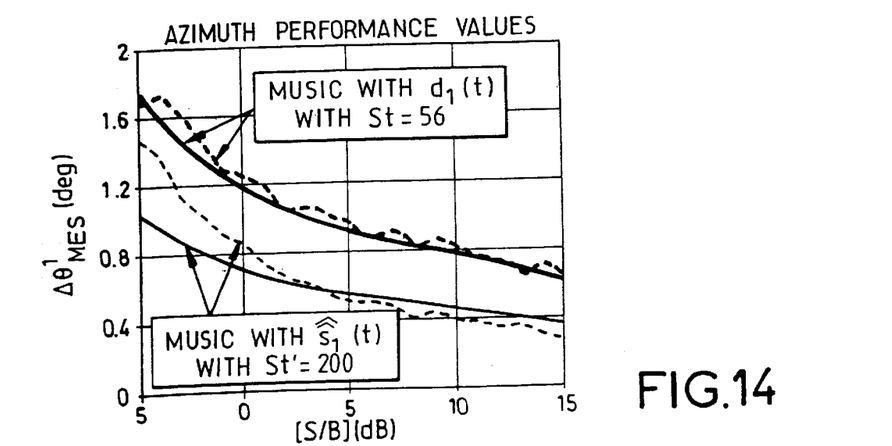

FIG. 14 gives a schematic view of the results obtained by simulation of the case of a sequence $d_1(t)$ subjected to interference by a source without any synchronization signal. The coefficient of spatial correlation between the two sources is equal to $c_{1/2}=0.9$. The reference direction-finding algorithms are therefore single-user algorithms in using $d_1(t)$ or $\hat{s}_1(t)$ depending on the method. The curves represent the precision $\Delta \theta^1_{MES}$ of the direction-finding operation for the 1$^{st}$ source as a function of the signal-to-noise ratio [S/B] of the two sources.

It can be seen that the reference methods using $d_1(t)$ or $\hat{s}_1(t)$ have the same behavior in single-source operation: the method with $d_1(t)$ follows its Cramer Rao bound and the method with the lengthened sequence $\hat{s}_1(t)$ follows this bound beyond 0 dB in terms of signal-to-noise ratio. Since, from the theoretical viewpoint, the Cramer Rao bound with $\hat{s}_1(t)$ is 1.88 times more precise than the one with $d_1(t)$, this simulation clearly shows that the method with the sequence having a duration $\delta t'$ is more precise than the method with the sequence having a duration $\delta t$.

The method described here above can be applied especially in a transmission system comprising a receiver consisting of N sensors connected to a device adapted to determining the directions of arrival of the different signals, such as a direction-finding device. The receiver comprises a processor equipped with a software program to implement the steps of the method, for all its variants of application.

What is claimed is:

1. A method of co-operative radio direction-finding in transmission in a system of radio direction-finding for a radiocommunications system comprising one or more transmission sources or transmitters, the transmitted signal comprising a reference sequence formed by a sequence of symbols $\{S_k\}$, the receiver comprising at least one array of several sensors coupled to a radio direction-finder, wherein the method comprises at least the following steps:

a) determining the reference signal or signals $d_i(t)$ associated with a transmitter m from the reference symbols $\{S_k\}$ and from the modulation defined by the format of the signals, b) defining the instant of arrival $t_k$ of one or more reference signals $d_i(t)$, c) from the signal $\underline{x}(t)$ received at the sensors, the instants of arrival $t_k$ and the reference signal or signals $d_i(t)$ derived from the step a), determining the value or values of incidence of the signals for a given transmitter.

2. A method according to claim 1, wherein the step a) is reiterated as many times as there are transmitters $M_0$ in the system.

3. A method according to claim 2 comprising a step for the separation of the transmitters $M_0$ through the estimation of the transfer matrix of the channel $H^u$ for the transmission of all the useful signals and by the extraction, from this matrix, of the transfer matrices $H_m{}^u$ of the channel associated with a useful transmitter m in order to determine the corresponding observation vector $\underline{x}^m(t)$.

4. A method according to claim 3, wherein the step c) is carried out by direction-finding by whitening, implemented on the observation vectors $\underline{x}^m(t)$.

5. A method according to claim 3, wherein the step c) is carried out by direction-finding by projection.

6. A method according to one of the claims 1 to 3 wherein the direction-finding step uses the azimuth angle $\theta$ corresponding to the incidence of a source in the plane of the array and/or the elevation angle $\Delta$ defined as the incidence with respect to the perpendicular of the plane of the array.

7. A method according to one of the claims 1 to 5 wherein the step a) may be performed on a duration $\delta t' > \delta t$, where $\delta t$ is the basic duration of the reference signal.

8. A method according to claim 7 wherein a spatial filter $W_m$ is determined from the learning signal $d_m(t)$ of a useful transmitter m in order to deduce the signal $s_m(t)$ coming from the useful transmitter before applying a direction-finding step.

9. A use of the method according to one of the claims 1 to 5 in radio communications systems for GSM or UMTS type signals.

10. A direction-finding device comprising means adapted to the implementation of the method according to one of the claims 1 to 5.

11. A method according to claim 6 wherein the step a) may be performed on a duration $\delta t' > \delta t$, where $\delta t$ is the basic duration of the reference signal.

12. A method according to claim 11 wherein a spatial filter $W_m$ is determined from the learning signal $d_m(t)$ of a useful transmitter m in order to deduce the signal $s_m(t)$ coming from the useful transmitter before applying a direction-finding step.

13. A use of the method according to claim 6 in radio communications systems for GSM or UMTS type signals.

14. A use of the method according to claim 7 in radio communications systems for GSM or UMTS type signals.

15. A use of the method according to claim 8 in radio communications systems for GSM or UMTS type signals.

16. A direction-finding device comprising means adapted to the implementation of the method according to claim 6.

17. A direction-finding device comprising means adapted to the implementation of the method according to claim 7.

18. A direction-finding device comprising means adapted to the implementation of the method according to claim 8.

19. A direction-finding device comprising means adapted to the implementation of the method according to claim 9.

* * * * *